United States Patent
Ruvio et al.

(10) Patent No.: US 9,560,071 B2
(45) Date of Patent: Jan. 31, 2017

(54) DEVICE FOR DETECTION AND PREVENTION OF AN ATTACK ON A VEHICLE

(71) Applicant: TOWER-SEC LTD., Herzliya (IL)

(72) Inventors: Guy Ruvio, Elad (IL); Saar Dickman, Tzur Moshe (IL); Yuval Weisglass, Kfar Sava (IL)

(73) Assignee: Tower-Sec Ltd., Kfar-Saba (IL)

( * ) Notice: Subject to any disclaimer, the term of this patent is extended or adjusted under 35 U.S.C. 154(b) by 0 days.

(21) Appl. No.: 14/436,123

(22) PCT Filed: Oct. 17, 2013

(86) PCT No.: PCT/IL2013/050838
§ 371 (c)(1),
(2) Date: Apr. 16, 2015

(87) PCT Pub. No.: WO2014/061021
PCT Pub. Date: Apr. 24, 2014

(65) Prior Publication Data
US 2015/0271201 A1    Sep. 24, 2015

Related U.S. Application Data

(60) Provisional application No. 61/795,426, filed on Oct. 17, 2012.

(51) Int. Cl.
*G06F 11/00* (2006.01)
*H04L 29/06* (2006.01)
(Continued)

(52) U.S. Cl.
CPC ......... *H04L 63/1466* (2013.01); *B60R 16/023* (2013.01); *G06N 99/005* (2013.01);
(Continued)

(58) Field of Classification Search
CPC ............ H04L 63/1408; H04L 63/1441; H04L 63/1466; H04L 67/12
(Continued)

(56) References Cited

U.S. PATENT DOCUMENTS 6,314,351 B1    11/2001    Chutorash
7,917,261 B2    3/2011    Melman
(Continued)

FOREIGN PATENT DOCUMENTS

| CN | 102123076 A | 7/2011 |
| CN | 102202303 A | 9/2011 |
| CN | 102461118 A | 5/2012 |

OTHER PUBLICATIONS

Nilsson et al. A defense-in-Depth Approach to securing the Wireless vehicle Infrastructure Journal of Networks vol. 4, No. 7, Sep. 1, 2009, pp. 552-564.
(Continued)

*Primary Examiner* — Samson Lemma
(74) *Attorney, Agent, or Firm* — Alleman Hall McCoy Russell & Tuttle LLP

(57) ABSTRACT

A new device for detection and prevention of an attack on a vehicle via its communication channels, having: an input-unit configured to collect real-time and/or offline data from various sources such as sensors, network based services, navigation applications, the vehicles electronic control units, the vehicle's bus-networks, the vehicle's subsystems, and on board diagnostics; a database, for storing the data; a detection-unit in communication with the input-unit; and an action-unit, in communication with the detection unit, configured for sending an alert via the communication channels and/or prevent the attack, by breaking or changing the attacked communication channels. The detection-unit is
(Continued)

configured to simultaneously monitor the content, the metadata and the physical-data of the data and detect the attack.

20 Claims, 2 Drawing Sheets

(51) Int. Cl.
*H04L 29/08* (2006.01)
*B60R 16/023* (2006.01)
*G06N 99/00* (2010.01)

(52) U.S. Cl.
CPC ...... *H04L 63/1408* (2013.01); *H04L 63/1441* (2013.01); *H04L 67/12* (2013.01)

(58) Field of Classification Search
USPC .......................................................... 726/23
See application file for complete search history.

(56) References Cited

U.S. PATENT DOCUMENTS

| 8,402,268 | B2* | 3/2013 | Dierickx | ................. | B60R 25/04 |
| | | | | | 713/164 |
| 2008/0148409 | A1* | 6/2008 | Ampunan | ............... | G06F 21/57 |
| | | | | | 726/26 |
| 2009/0005938 | A1* | 1/2009 | Phipps | ................... | B60N 2/448 |
| | | | | | 701/49 |
| 2009/0170539 | A1* | 7/2009 | Kortge | ................ | H04L 63/1441 |
| | | | | | 455/466 |
| 2010/0296387 | A1* | 11/2010 | Jain | ....................... | G06F 21/606 |
| | | | | | 370/216 |

OTHER PUBLICATIONS

Israeli Patent Office, International Search Report and Written Opinion dated Feb. 17, 2014 in PCT/IL2013/050838, Israel.
Supplementary European Search Report and the European Search Opinion Dated May 11, 2016 From the European Patent Office Re. Application No. 13847130.5.
Larson et al. "An Approach to Sepcficiation-Based Attack Detection for In-Vehicle Networks", 2008 IEEE Intelligent Vehicles Symposium, Eindhoven, The Netherlands, Jun. 4-6, 2008, XP031318908, p. 220-225, Jun. 4, 2008. Abstract, Fig.1, Section IV, Section V.
Mueter et al. "A Structured Approach to Anomaly Detection for In-Vehicle Networks", 2010 Sixth International Conference on Information Assurance and Security, Aug. 23-25, 2016, XP031777189, p. 92-98, Aug. 23, 2010. Abstract, Tables I, II, Section I, Section III, Section IV.
State Intellectual Property Office of the People's Republic of China, First Office Action Issued in Chinese Patent Application No. 201380066166.7, Aug. 8, 2016, 30 pages.

* cited by examiner

DEVICE FOR DETECTION AND PREVENTION OF AN ATTACK ON A VEHICLE

FIELD OF THE INVENTION

This invention generally relates to a device that enables detection of an attack such as a cyber attack or communication attack on vehicles

BACKGROUND OF THE INVENTION

Modern automobiles are no longer mere mechanical devices; they are pervasively monitored and controlled by dozens of digital computers coordinated via internal vehicular networks. While this transformation has driven major advancements in efficiency and safety, it has also introduced a range of new potential risks.

Because many of today's cars contain cellular connections and Bluetooth wireless technology, it is possible for a hacker, working from a remote location, to take control of various features, like the car locks and brakes, as well as to track the vehicle's location, eavesdrop on its cabin and steal vehicle data. Modern automobiles are pervasively computerized, and hence potentially vulnerable to such an attack. However, while previous research has shown that the internal networks within some modern cars are insecure, the associated threat model requiring prior physical access has justifiably been viewed as unrealistic. Exploitation is feasible via a broad range of attack vectors remote or physical connections, including mechanic diagnostic tools and CD players, Bluetooth, cellular, and radio; further, wireless communications channels allow long and short distance vehicle control and communication, location tracking, in-cabin audio ex-filtration and theft.

Several solutions were disclosed in the prior art, including:

Chutorash, U.S. Pat. No. 6,314,351, disclosed a vehicle computer system which provides a firewall between an auto PC and its application software and the vehicle bus and vehicle components. The firewall prevents unauthorized access by software in the auto PC to the vehicle bus and vehicle components. Preferably, the firewall utilizes encryption technology within the handshake between the auto PC software and firewall.

Dierickx, U.S. Pat. No. 8,402,268, disclosed a system for providing network security on a vehicle information system and methods for manufacturing and using same. The security system comprises an all-in-one security system that facilitates security system functions for the vehicle information system. Exemplary security system functions include secure storage of keys used to encrypt and/or decrypt system data, security-related application programming interfaces, a security log file, and/or private data. The security system likewise can utilize antivirus software, anti-spyware software, an application firewall, and/or a network firewall. As desired, the security system can include an intrusion prevention system and/or an intrusion detection system. If the information system includes a wireless distribution system, the security system can include an intrusion prevention (and/or detection) system that is suitable for use with wireless network systems. Thereby, the security system advantageously can provide a defense in depth approach by adding multiple layers of security to the information system.

Melman, U.S. Pat. No. 7,917,261, disclosed a method of controlling a control system for a vehicle comprising: providing at least one data communications bus; providing at least one firewall in communication with at least one data communications bus, wherein the at least one firewall creates at least two data communications bus from the at least one data communications bus; providing at least one vehicle device in communication with at least one of at least two data communications bus; providing at least one vehicle device in communication with at least one firewall; and providing at least one firewalled controller in communication with at least one firewall, wherein the firewalled controller transmits a directive to the firewall and the firewall transmits the directive through the at least two data communications bus which controls the at least one vehicle device.

However, none of the above prior art disclosures utilizes the unique characteristics of the vehicle's functioning logic and potential attack vectors.

BRIEF DESCRIPTION OF THE DRAWINGS

The invention is herein described, by way of example only, with reference to the accompanying drawings, wherein.

SUMMARY OF THE INVENTION

Figure 1:
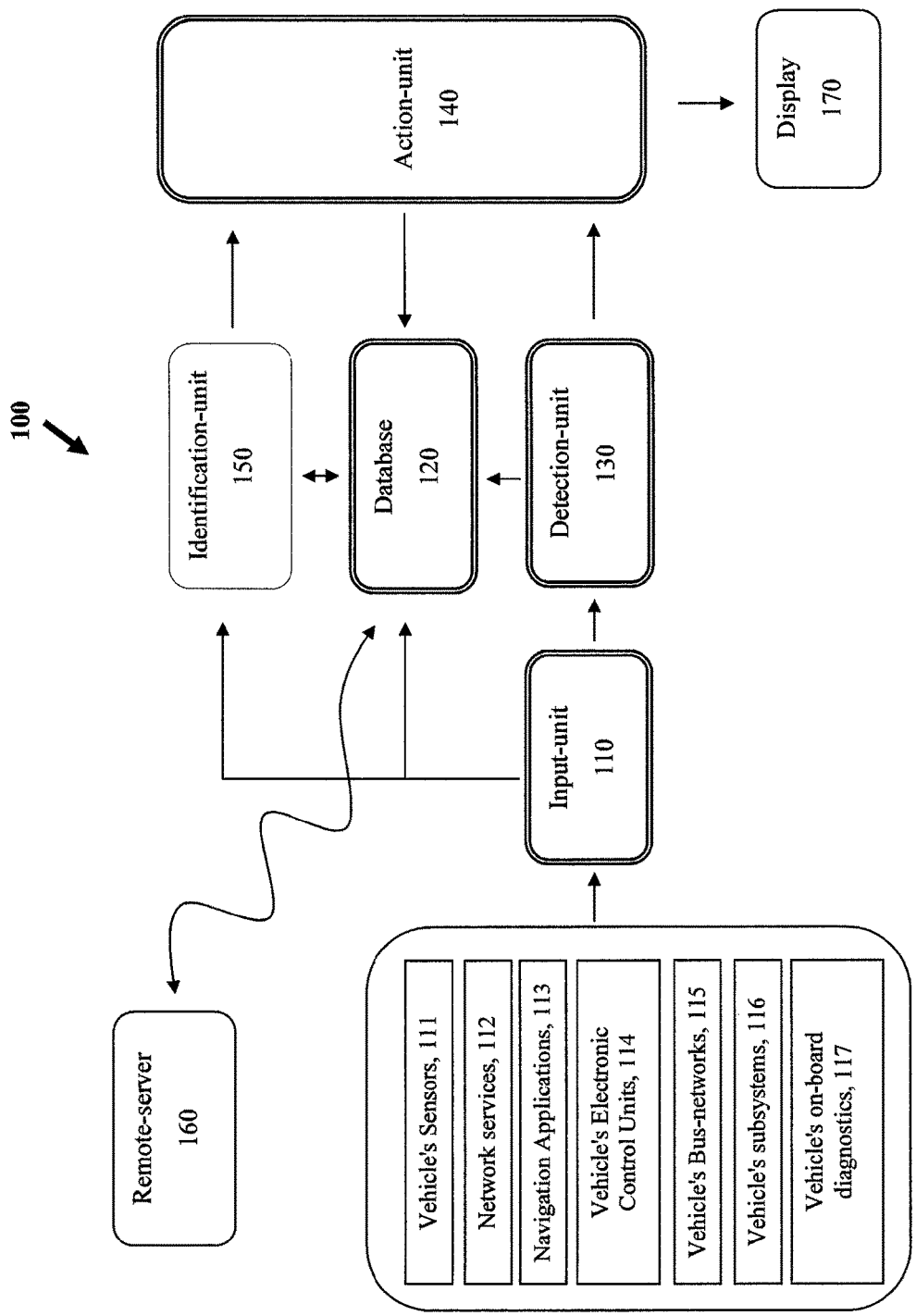
FIG. 1 is a schematic diagram showing the device for detection and prevention of an attack on a vehicle and its basic components.

It is one object of the present invention to disclose a device for detection and prevention of at least one attack on a vehicle via its one or more communication channels, said device comprising:
  a. an input-unit configured to collect real-time and/or offline data from at least one source selected from a group consisting of:
    one or more sensors,
    one or more network based services,
    one or more navigation applications or navigation devices,
    one or more electronic control units (ECU) of said vehicle,
    one or more bus-networks of said vehicle,
    one or more subsystems of said vehicle, and
    one or more on board diagnostics (OBD);
  b. a database, configured to store said data;
  c. a detection-unit in communication with said input-unit; and
  d. an action-unit, in communication with said detection unit, configured to send an alert via said communication channels and/or prevent said attack, by breaking or changing the attacked said one or more communication channels;
wherein said detection-unit is configured to simultaneously monitor the content, the meta-data and the physical-data of said data and detect said attack.

It is another object of the present invention to disclose the device as defined above, wherein said detection-unit configured to detect said attack based on at least one characteristic selected from a group consisting of:
  a. irregular said data's content;
  b. irregular source of said data;
  c. irregular destination for said data;
  d. irrational said data's content, when compared with data received by at least one other said source;

e. irrational action of at least one of said subsystems, when compared with data received by at least one other subsystem;
f. irrational action between at least two of said subsystems;
g. irrational action of at least one of said subsystems, when compared with said data received by at least one of said sensors;
h. irrational meta-data;
i. irrational meta-content;
j. jam or blockage of said communication channels and/or said network-based services; and
k. sudden change in the signal features of said network-based services and/or said sensors.

It is another object of the present invention to disclose the device as defined above, wherein said database further comprises parameters of at least one known-attack, previously detected as said attack.

It is another object of the present invention to disclose the device as defined above, wherein said action-unit and/or said detection unit further configured to extract said parameters of said attack and update said database.

It is another object of the present invention to disclose the device as defined above, wherein said device further comprising an identification-unit configured to identify said parameters of said known-attack and update said action-unit.

It is another object of the present invention to disclose the device as defined above, wherein said device further comprising a remote-server configured to communicate with said database for delivering and/or receiving at least one additional said parameters of said known-attack.

It is another object of the present invention to disclose the device as defined above, wherein said remote-server configured to collect said data from at least one additional vehicle, monitor the content, the meta-data and the physical-data of said data, detect said attack and update said attack to database.

It is another object of the present invention to disclose the device as defined above, wherein said parameters are selected from a group consisting of:
a. irregular said data's content;
b. irregular source of said data;
c. irregular destination for said data;
d. irrational said data's content, when compared with data received by at least one other said source;
e. irrational action of at least one of said subsystems, when compared with data received by at least one other subsystem;
f. irrational action between at least two of said subsystems;
g. irrational action of at least one of said subsystems, when compared with said data received by at least one of said sensors;
h. irrational meta-data;
i. irrational meta-content;
j. jam or blockage of said communication channels and/or said network-based services;
k. sudden change in the signal features of said network-based services and/or said sensors;
l. said vehicle location;
m. said vehicle brand;
n. said sensors;
o. said communication channels;
p. said navigation application;
q. said navigation device; and
r. communication interfaces.

It is another object of the present invention to disclose the device as defined above, wherein said detection-unit comprising a machine-learning engine configured to learn the features and behaviour of said data's content, meta-data and physical-data and recognize any unfamiliar behaviour.

It is another object of the present invention to disclose the device as defined above, wherein said device further comprising a display-unit configured to notify and alert a user of said attack.

It is another object of the present invention to disclose the device as defined above, wherein said device is in communication with a remote display-unit configured to notify and alert a user of said attack.

It is another object of the present invention to disclose the device as defined above, wherein said one or more said sensors are selected from a group consisting of:
a. distance sensor,
b. velocity sensor,
c. temperature sensor,
d. satellite transmission sensor,
e. cellular transmission sensors,
f. video image,
g. air-fuel ratio meter,
h. blind spot monitor,
i. crankshaft position sensor,
j. curb feeler, used to warn driver of curbs,
k. defect detector, used on railroads to detect axle and signal problems in passing trains
l. engine coolant temperature (ECT) sensor, used to measure the engine temperature,
m. hall effect sensor, used to time the speed of wheels and shafts,
n. manifold absolute pressure (MAP) sensor, used in regulating fuel metering,
o. mass flow sensor, or mass airflow (MAF) sensor, used to tell the mass of air entering the engine,
p. oxygen sensor, used to monitor the amount of oxygen in the exhaust,
q. parking sensors, used to alert the driver of unseen obstacles during parking maneuvers,
r. radar gun, used to detect the speed of other objects,
s. speedometer, used measure the instantaneous speed of a land vehicle,
t. speed sensor, used to detect the speed of an object,
u. throttle position sensor, used to monitor the position of the throttle in an internal combustion engine,
v. tire-pressure monitoring sensor, used to monitor the air pressure inside the tires,
w. torque sensor, or torque transducer or torque-meter measures torque (twisting force) on a rotating system,
x. transmission fluid temperature sensor, used to measure the temperature of the transmission fluid,
y. turbine speed sensor (TSS), or input speed sensor (ISS), used to measure the rotational speed of the input shaft or torque converter,
z. variable reluctance sensor, used to measure position and speed of moving metal components,
aa. vehicle speed sensor (VSS), used to measure the speed of the vehicle,
bb. water sensor or water-in-fuel sensor, used to indicate the presence of water in fuel,
cc. wheel speed sensor, used for reading the speed of a vehicle's wheel rotation,
dd. comfort sensors including: seats position, seat heat, air condition and passengers location, and
ee. any combination thereof.

It is another object of the present invention to disclose the device as defined above, wherein said one or more said subsystems are selected from a group consisting of:
a. tire pressure monitoring,
b. stability control,
c. cruise control,
d. airbag control,
e. powertrain control module (PCM),
f. transmission control module (TCM),
g. brake control module (BCM),
h. central control module (CCM),
i. central timing module (CTM),
j. general electronic module (GEM),
k. body control module (BCM),
l. suspension control module (SCM),
m. convenience control unit (CCU),
n. convenience control unit (CCU),
o. convenience control unit (CCU),
p. engine control unit (ECU),
q. electric power steering control unit (PSCU),
r. human machine interface (HMI),
s. seat control unit,
t. speed control unit,
u. telephone control unit (TCU),
v. transmission control unit (TCU),
w. brake control module (ABS or ESC),
x. crash sensors,
y. airbags,
z. seatbelts,
aa. tire pressure monitoring system (TPMS),
bb. electronic stability control system (ESC),
cc. traction control system (TCS),
dd. anti lock braking system (ABS),
ee. electronic brake assistance system (EBA),
ff. electronic brake force distribution,
gg. electronic brake-force distribution (EBD) system,
hh. emergency shutdown,
ii. driven notifications and alerts,
jj. pedestrian object recognition,
kk. lane keeping assistance,
ll. collation avoidance,
mm. adaptive headlamps control,
nn. reverse backup sensors,
oo. adaptive cruise control,
pp. active cruise control (ACC),
qq. traction control systems,
rr. electronic stability control,
ss. automated parking system,
tt. multimedia,
uu. active noise cancelation (ANC),
vv. radio,
ww. radio data system (RDS),
xx. driver information functions,
yy. AM/FM or satellite radio,
zz. DC/DVD player,
aaa. payment systems,
bbb. in vehicle Wi-Fi router,
ccc. internal lights,
ddd. climate control,
eee. chairs adjustment,
fff. electric windows,
ggg. mirror adjustment,
hhh central locking,
iii. battery management,
jjj. charging management,
kkk vehicle-grid system,
lll. active cruise control (ACC),
mmm. remote control keys,
nnn. theft deterrent systems,
ooo. immobilizer system,
ppp. security systems,
qqq. digital cameras,
rrr. night vision,
sss. lasers,
ttt. radar,
uuu. RF sensors,
vvv. infotainment system and
www. robotic gear-shaft.

It is another object of the present invention to disclose the device as defined above, wherein said ECU is selected from a group consisting of:
a. electronic/engine control module (ECM),
b. powertrain control module (PCM),
c. transmission control module (TCM),
d. brake control module (BCM),
e. central control module (CCM),
f. central timing module (CTM),
g. general electronic module (GEM),
h. body control module (BCM),
i. suspension control module (SCM),
j. airbag control unit (ACU),
k. body control module (BCU), controls door locks, electric windows, and courtesy lights,
l. convenience control unit (CCU),
m. door control unit (DCU),
n. engine control unit,
o. electric power steering control unit (PSCU), integrated into the electric power steering (EPS) power-pack,
p. human-machine interface (HMI),
q. powertrain control module (PCM),
r. seat control unit,
s. speed control unit (SCU),
t. telephone control unit (TCU),
u. telematic control unit (TCU),
v. transmission control unit (TCU),
w. brake control module (BCM),
x. on board or integrated ECU processing remote services, and
y. any combination thereof.

It is another object of the present invention to disclose the device as defined above, wherein said action-unit configured to initiate further collection of said data from said at least one source.

It is another object of the present invention to disclose the device as defined above, wherein said device further comprises a commercialized anti-virus, malware-application, firewall or other malicious code database, Which can be provided by a third party.

It is another object of the present invention to disclose the device as defined above, wherein said vehicle is driven by a human, by an at least partially autonomous driving system, or by a remote control system or by full autonomous driving system.

It is another object of the present invention to disclose the device as defined above, wherein said vehicle is a robotic platform.

It is another object of the present invention to disclose the device as defined above, wherein said vehicle travels via land, water or air.

It is another object of the present invention to disclose the device as defined above, wherein said device is at least partially embedded within one of said vehicle's hardware-cards, software-units and/or within said remote-server.

It is another object of the present invention to disclose the device as defined above, wherein said device further comprises an assessment engine configured to evaluate risk-level of said attack to said vehicle and its passengers and prioritize said attack.

It is another object of the present invention to disclose the device as defined above, wherein said one or more network based services are selected from a group consisting of: web, physical cable, Wi-Fi, cellular, blue tooth, RF, GPS, vehicle to vehicle communication, vehicle to passenger infrastructure, environment to vehicle infrastructure.

It is another object of the present invention to disclose the device as defined above, wherein said one or more navigation applications or devices are selected from a group consisting of: satellite navigator, cellular navigator and inertial dedicated navigator.

It is another object of the present invention to disclose the device as defined above, wherein said one or more navigation applications or devices are said vehicle's own subsystem navigator.

It is another object of the present invention to disclose a method for detecting and preventing at least one attack on a vehicle via its one or more communication channels, said method comprising steps of:
  a. collecting real-time and/or offline data from at least one source selected from a group consisting of:
    one or more sensors,
    one or more network based services,
    one or more navigation applications or navigation devices,
    one or more electronic control units (ECU) of said vehicle,
    one or more bus-networks of said vehicle,
    one or more subsystems of said vehicle, and
    one or more on board diagnostics (OBD);
  b. storing said data in a database;
  c. monitoring said data for an attack; and if detecting said attack,
  d. acting by means of sending an alert and/or preventing said attack by breaking or changing said one or more communication channels;
wherein said monitoring includes simultaneous examination of the content, the meta-data and the physical-data of said data for said detecting of said attack.

It is another object of the present invention to disclose the method as defined above, wherein said detecting of said attack based on at least one characteristic selected from a group consisting of:
  a. irregular said data's content;
  b. irregular source of said data;
  c. irregular destination for said data;
  d. irrational said data's content, when compared with data received by at least one other said source;
  e. irrational action of at least one of said subsystems, when compared with data received by at least one other subsystem;
  f. irrational action between at least two of said subsystems;
  g. irrational action of at least one of said subsystems, when compared with said data received by at least one of said sensors;
  h. irrational meta-data;
  i. irrational meta-content;
  j. jam or blockage of said communication channels and/or said network-based services; and
  k. sudden change in the signal features of said network-based services and/or said sensors.

It is another object of the present invention to disclose the method as defined above, wherein said step of storing further comprises storing of parameters of at least one known-attack, previously detected as said attack.

It is another object of the present invention to disclose the method as defined above, further comprising step of extracting said parameters.

It is another object of the present invention to disclose the method as defined above, further comprising step of identifying said parameters of said known-attack and updating for said step of alerting.

It is another object of the present invention to disclose the method as defined above, further comprising step of communicating said database with a remote-server delivering and/or receiving at least one additional said parameters of said known-attack.

It is another object of the present invention to disclose the method as defined above, wherein said remote-server configured for collecting said data from at least one additional vehicle, monitoring the content, the meta-data and the physical-data of said data, detecting said attack and updating said attack to database.

It is another object of the present invention to disclose the method as defined above, wherein said parameters are selected from a group consisting of:
  a. irregular said data's content;
  b. irregular source of said data;
  c. irregular destination for said data;
  d. irrational said data's content, when compared with data received by at least one other said source;
  e. irrational action of at least one of said subsystems, when compared with data received by at least one other subsystem;
  f. irrational action between at least two of said subsystems;
  l. irrational action of at least one of said subsystems, when compared with said data received by at least one of said sensors;
  m. irrational meta-data;
  n. irrational meta-content;
  g. jam or blockage of said communication channels and/or said network-based services;
  h. sudden change in the signal features of said network-based services and/or said sensors;
  i. said vehicle location;
  j. said vehicle brand;
  k. said sensors;
  l. said communication channels;
  m. said navigation application
  n. said navigation device; and
  o. communication interfaces.

It is another object of the present invention to disclose the method as defined above, wherein said step of detecting further includes learning the features and behaviour of said data's content, meta-data and physical-data and recognizing any unfamiliar behaviour.

It is another object of the present invention to disclose the method as defined above, further comprising step of displaying said alert for notifying and alerting a user of said attack.

It is another object of the present invention to disclose the method as defined above, wherein said one or more said sensors are selected from a group consisting of:
  a. distance sensor,
  b. velocity sensor,
  c. temperature sensor,
  d. satellite transmission sensor, e. cellular transmission sensors,
f. video image,
g. air-fuel ratio meter,
h. blind spot monitor,
i. crankshaft position sensor,
j. curb feeler, used to warn driver of curbs,
k. defect detector, used on railroads to detect axle and signal problems in passing trains
l. engine coolant temperature sensor (ECT), used to measure the engine temperature,
m. hall effect sensor, used to time the speed of wheels and shafts,
n. manifold absolute pressure (MAP) sensor, used in regulating fuel metering,
o. mass flow sensor, or mass airflow (MAF) sensor, used to tell mass of air entering the engine,
p. oxygen sensor, used to monitor the amount of oxygen in the exhaust,
q. parking sensors, used to alert the driver of unseen obstacles during parking maneuvers,
r. radar gun, used to detect the speed of other objects,
s. speedometer, used measure the instantaneous speed of a land vehicle,
t. speed sensor, used to detect the speed of an object,
u. throttle position sensor, used to monitor the position of the throttle in an internal combustion engine,
v. tire-pressure monitoring sensor, used to monitor the air pressure inside the tires,
w. torque sensor, or torque transducer or torque-meter measures torque (twisting force) on a rotating system,
x. transmission fluid temperature sensor, used to measure the temperature of the transmission fluid,
y. turbine speed sensor (TSS), or input speed sensor (ISS), used to measure the rotational speed of the input shaft or torque converter,
z. variable reluctance sensor, used to measure position and speed of moving metal components,
aa. vehicle speed sensor (VSS), used to measure the speed of the vehicle,
bb. water sensor or water-in-fuel sensor, used to indicate the presence of water in fuel
cc. wheel speed sensor, used for reading the speed of a vehicle's wheel rotation,
dd. comfort sensors including: seats position, seat heat, air condition and passengers location, and
ee. any combination thereof.

It is another object of the present invention to disclose the method as defined above, wherein said one or more said subsystems are selected from a group consisting of:
a. tire pressure monitoring,
b. stability control,
c. cruise control,
d. airbag control,
e. powertrain control module (PCM),
f. transmission control module (TCM),
g. brake control module (BCM),
h. central control module (CCM),
i. central timing module (CTM),
j. general electronic module (GEM),
k. body control module (BCM),
l. suspension control module (SCM),
m. convenience control unit (CCU),
n. convenience control unit (CCU),
o. convenience control unit (CCU),
p. engine control unit (ECU),
q. electric power steering control unit (PSCU),
r. human machine interface (HMI),
s. seat control unit,
t. speed control unit,
u. telephone control unit (TCU),
v. transmission control unit (TCU),
w. brake control module (ABS or ESC),
x. crash sensors,
y. airbags,
z. seatbelts,
aa. tire pressure monitoring system (TPMS),
bb. electronic stability control system (ESC),
cc. traction control system (TCS),
dd. anti lock braking system (ABS),
ee. electronic brake assistance system (EBA),
ff. electronic brake force distribution,
gg. electronic brake-force distribution (EBD) system,
hh. emergency shutdown,
ii. driven notifications and alerts,
jj. pedestrian object recognition,
kk. lane keeping assistance,
ll. collation avoidance,
mm. adaptive headlamps control,
nn. reverse backup sensors,
oo. adaptive cruise control,
pp. active cruise control (ACC),
qq. traction control systems,
n. electronic stability control,
ss. automated parking system,
tt. multimedia,
uu. active noise cancelation (ANC),
vv. radio,
ww. radio data system (RDS),
xx. driver information functions,
yy. AM/FM or satellite radio,
zz. DC/DVD player,
aaa. payment systems,
bbb. in vehicle Wi-Fi router,
ccc. internal lights,
ddd. climate control,
eee. chairs adjustment,
fff. electric windows,
ggg. mirror adjustment,
hhh central locking,
iii. battery management,
jjj. charging management,
kkk vehicle-grid system,
lll. active cruise control (ACC),
mmm. remote control keys,
nnn. theft deterrent systems,
ooo. immobilizer system,
ppp. security systems,
qqq. digital cameras,
rrr. night vision,
sss. lasers,
ttt. radar,
uuu. RF sensors,
vvv. infotainment system and
www. robotic gear-shaft.

It is another object of the present invention to disclose the method as defined above, wherein said ECU is selected from a group consisting of:
a. electronic engine control module (ECM),
b. powertrain control module (PCM),
c. transmission control module (TCM),
d. brake control module (BCM),
e. central control module (CCM),
f. central timing module (CTM),
g. general electronic module (GEM), h. body control module (BCM),
i. suspension control module (SCM),
j. airbag control unit (ACU),
k. body control module (BCU), controls door locks, electric windows, and courtesy lights,
l. convenience control unit (CCU),
m. door control unit (DCU),
n. engine control unit,
o. electric power steering control unit (PSCU), integrated into the electric power steering (EPS) power-pack,
p. human-machine interface (HMI),
q. powertrain control module (PCM),
r. seat control unit,
s. speed control unit (SCU),
t. telephone control unit (TCU),
u. telematic control unit (TCU),
v. transmission control unit (TCU),
w. brake control module (BCM),
x. on board or integrated ECU processing remote services, and
y. any combination thereof.

It is another object of the present invention to disclose the method as defined above, further comprising step of evaluating the risk-level of said attack to said vehicle and its passengers and prioritizing said attack.

It is still an object of the present invention to disclose the method as defined above, further comprising step of selecting said one or more network based from a group consisting of: web, physical cable, Wi-Fi, cellular, blue tooth, RF, GPS, vehicle to vehicle communication, vehicle to passenger infrastructure, environment to vehicle infrastructure.

It is lastly an object of the present invention to disclose the method as defined above, further comprising step of selecting said one or more navigation applications or devices from a group consisting of: satellite navigator, cellular navigator, north finding systems (NFS), or inter-vehicle orientation system and inertial dedicated navigator.

DETAILED DESCRIPTION OF THE SPECIFIC EMBODIMENTS

The following description is provided, alongside all chapters of the present invention, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a device and method for detecting and preventing vehicle's attack.

The potential damage of a cyber attack on vehicles functional units can be unprecedented, for example a remote attack on air bag system can potentially trigger activation of the airbag during a regular driving or manipulating tire pressure management system wireless transmission in order to spoof actual pressure reporting. The traditional information security approaches such as firewall, antivirus and network IDS may not be sufficient to answer this critical need, since attack vectors are different, since while the vehicle has unique inter-unit functional logic, such as direct access through vehicle's different sensors, or through remote control service or through other vehicles or infrastructure units (V2V, V2I).

This present invention present a new device and method for dealing with attack threats, such as cyber attack or communication attack. The present invention is suited for protecting such attacks, by utilizing the unique characteristics of: the vehicle's functioning logic, the potential attack vectors, the communication between the vehicle's systems and their combination.

The term Electronic Control Units (ECU), used herein, refers to any embedded system that controls one or more of the electrical system or subsystems in a motor vehicle. Types of ECU include electronic/engine control module (ECM), powertrain control module (PCM), transmission control module (TCM), brake control module (BCM or EBCM), central control module (CCM), central timing module (CTM), general electronic module (GEM), body control module (BCM), suspension control module (SCM), control unit, or control module. Taken together, these systems are sometimes referred to as the car's computer. (Technically there is no single computer but multiple ones.) Sometimes one assembly incorporates several of the individual control modules (PCM is often both engine and transmission). Some modern motor vehicles have up to 80 ECUs. Embedded software in ECUs continues to increase in line count, complexity, and sophistication. Managing the increasing complexity and number of ECUs in a vehicle has become a key challenge for original equipment manufacturers (OEMs).

The term Meta-data, used herein, refers to "data about data". The term is used in two fundamentally different concepts structural meta-data and descriptive meta-data. Structural meta-data is about the design and specification of the data's structure or in other words data about the containers of data. Descriptive meta-data is about individual instances of application data, the data content. In this case, a useful description would be "data about data-content" or "content about content" thus meta-content.

The term physical-data, used herein, refers to the electrical and physical specifications of the data connection. The physical-data defines the characteristics between a device and a physical transmission medium (e.g. a copper or fiber optical cable). This includes the layout of pins, voltages, line impedance, cable specifications, signal timing, hubs, repeaters, network adapters, Intensity, frequency, gradient, changing amplitude, modulation method and more.

The term irrational, used herein, refers to fallacious, illegitimate, inconsequent, inconsequential, invalid, illogical, non-rational, unreasonable, unreasoning, unsound, unexpected or weak data's content, meta-data, physical-data or the resulted action, based on the vehicle's present: status, action or condition, or when comparing to data collected from the different data sources.

The term vehicle, used herein, refers to a mobile machine that transports passengers or cargo such as bicycle, car, truck, bus, motorcycles, trains, ships, boats aircraft watercraft, aircraft and spacecraft. The vehicle can be driven by a human, by an at least partially autonomous driving system, or by a remote control system. The vehicle may also be a robotic platform. The vehicle may travel via land, water or air.

The term communication channels, used herein, refer to a physical transmission medium, such as a wire, or to a logical connection over a multiplexed medium such as a radio channel. Channels are used to convey information signals, for example a digital bit stream, from one or several senders (or transmitters) to one or several receivers. A channel has a certain capacity for transmitting information, often measured by its bandwidth in Hz or its data rate in bits per second. Communicating data from one location to another requires some form of pathway or medium. These pathways, called communication channels, use two types of media: cable (twisted-pair wire, cable, and fiber-optic cable) and broadcast (microwave, satellite, radio, and infrared). Cable or wire-line media use physical wires of cables to transmit data and information. Twisted-pair wire and coaxial cables are made of copper, and fiber-optic cable is made of glass.

The term network based services used herein, refers to web, physical cable, Wi-Fi, mobile, blue tooth, RF and GPS.

The present invention provides a new device for detection and prevention of at least one attack on a vehicle via its one or more communication channels, the device comprising:
 a. an input-unit configured to collect real-time and/or offline data from at least one source selected from a group consisting of:
  one or more sensors,
  one or more network based services,
  one or more navigation applications or navigation devices,
  one or more electronic control units (ECU) of the vehicle,
  one or more bus-networks of the vehicle,
  one or more subsystems of the vehicle, and
  one or more On Board Diagnostics (OBD);
 b. a database, configured to store the data;
 c. a detection-unit in communication with the input-unit;
 d. an action-unit, in communication with the detection unit, configured to send an alert via the communication channels and/or prevent the attack, by breaking or changing the attacked the one or more communication channels;
wherein the detection-unit is configured to simultaneously monitor the content, the meta-data and the physical-data of the data and detect the attack.

The detection-unit configured for monitoring and detecting the attack based on at least one characteristic selected from a group consisting of:
 a. irregular the data's content;
 b. irregular source of the data;
 c. irregular destination for the data;
 d. irrational the data's content, when compared with data received by at least one other the source;
 e. irrational action of at least one of the vehicle's subsystems, when compared with data received by at least one other subsystem;
 f. irrational action between at least two of the subsystems;
 g. irrational action of at least one of the vehicle's subsystems, when compared with the data received by at least one of the sensors;
 h. irrational meta-data;
 i. irrational meta-content;
 j. jam or blockage of the communication channels and/or the network-based services; and
 k. sudden change in the signal features of the network-based services and/or the sensors.

The present invention provides a new method for detecting and preventing at least one attack on a vehicle via its one or more communication channels, the method comprising steps of:
 a. collecting real-time and/or offline data from at least one source selected from a group consisting of:
  one or more sensors,
  one or more network based services,
  one or more navigation applications or navigation devices,
  one or more electronic control units (ECU) of the vehicle,
  one or more bus-networks of the vehicle,
  one or more subsystems of the vehicle, and
  one or more on board diagnostics (OBD);
 b. storing the data in a database;
 c. monitoring the data for an attack; and if detecting the attack, and
 d. acting by means of sending an alert and/or preventing the attack by breaking or changing the one or more communication channels;
wherein the monitoring includes simultaneous examination of the content, the meta-data and the physical-data of the data for the detecting of the attack.

According to an embodiment of the present invention, the database further comprises parameters of at least one known-attack, previously detected. The parameters can be selected from: irregular the data's content; irregular source of the data; irregular destination for the data; irrational the data's content, when compared with data received by at least one other the source; irrational action of at least one of the vehicle's subsystems, when compared with data received by at least one other subsystem; irrational action between at least two of the subsystems; irrational action of at least one of the vehicle's subsystems, when compared with the data received by at least one of the sensors; irrational meta-data; irrational meta-content; jam or blockage of the communication channels and/or the network-based services; sudden change in the signal features of the network-based services and/or the sensors; the vehicle location; the vehicle brand; the sensors; the communication channels; the navigation application; the navigation device; and communication interfaces.

According to another embodiment, the action-unit and/or the detection unit are configured to extract these parameters of the attack and update the database.

According to an embodiment of the present invention, the device further comprises an identification-unit, configured to identify the above mentioned known parameters of the known-attack and update the action-unit.

According to another embodiment, the action-unit may initiate further collection of data from at least one the sources.

According to an embodiment of the present invention, the device further comprises a remote-server configured to communicate with the database for delivering and/or receiving additional parameters of known-attacks detected by other similar devices.

According to another embodiment, the remote-server is configured to collect the data from at least one additional vehicle, to monitor the content, the meta-data and the physical-data of the data, to detect the attack and to update the database of an attack.

According to an embodiment of the present invention, the detection-unit comprises a machine-learning engine configured to learn the features and behaviour of the data's content, meta-data and physical-data and recognize any unfamiliar behaviour.

According to an embodiment of the present invention, the device further comprises a display-unit configured to notify and alert a user of the attack. The device can also be in communication with a remote display-unit configured to notify and alert a user of an attack.

According to another embodiment of the present, invention the device may utilize a commercialized anti-virus, malware-application, firewall or other malicious code database that are offered in the market.

According to another embodiment, the device is at least partially embedded within one of the vehicle's hardware-cards, software-units and/or within the remote-server.

According to another embodiment, the device further comprises an assessment engine, for evaluating risk-level of the attack to the vehicle and its passengers and for prioritizing the detected attack.

The sensors, as mentioned above, can be selected from: distance sensor (for avoiding collision), velocity and acceleration sensors, temperature sensor, satellite transmission sensor, cellular transmission sensors, video image, air-fuel ratio meter, blind spot monitor, crankshaft position sensor, curb feeler, used to warn driver of curbs, defect detector, used on railroads to detect axle and signal problems in passing trains, engine coolant temperature sensor, or ECT sensor, used to measure the engine temperature, hall effect sensor, used to time the speed of wheels and shafts, Manifold Absolute Pressure (MAP) sensor, used in regulating fuel metering, mass flow sensor, or mass airflow (MAF) sensor, used to tell the ECU the mass of air entering the engine, oxygen sensor, used to monitor the amount of oxygen in the exhaust, parking sensors, used to alert the driver of unseen obstacles during parking maneuvers, radar gun, used to detect the speed of other objects, speedometer, used measure the instantaneous speed of a land vehicle, speed sensor, used to detect the speed of an object, throttle position sensor, used to monitor the position of the throttle in an internal combustion engine, tire-pressure monitoring sensor, used to monitor the air pressure inside the tires, torque sensor, or torque transducer or torque-meter measures torque (twisting force) on a rotating system, transmission fluid temperature sensor, used to measure the temperature of the transmission fluid, turbine speed sensor (TSS), or input speed sensor (ISS), used to measure the rotational speed of the input shaft or torque converter, variable reluctance sensor, used to measure position and speed of moving metal components, vehicle speed sensor (VSS), used to measure the speed of the vehicle, water sensor or water-in-fuel sensor, used to indicate the presence of water in fuel, wheel speed sensor, used for reading the speed of a vehicle's wheel rotation, and any combination thereof.

The subsystems, as mentioned above, can be selected from: tire pressure monitoring, stability control, cruise control, airbag control, Powertrain Control Module (PCM), Transmission Control Module (TCM), Brake Control Module (BCM), Central Control Module (CCM), Central Timing Module (CTM), General Electronic Module (GEM), Body Control Module (BCM), Suspension Control Module (SCM), Convenience Control Unit (CCU), Convenience Control Unit (CCU), Convenience Control Unit (CCU), Engine Control Unit (ECU), Electric Power Steering Control Unit (PSCU), Human Machine Interface (HMI), seat control unit, speed control unit, Telephone Control Unit (TCU), Transmission Control Unit (TCU), Brake Control Module (ABS or ESC), crash sensors, airbags, seatbelts, Tire Pressure Monitoring System (TPMS), Electronic Stability Control system (ESC), Traction Control System (TCS), Anti lock braking system (ABS), Electronic Brake Assistance system (EBA), electronic brake force distribution, electronic brake-force distribution (EBD) system, Emergency shutdown, Driven notifications and alerts, Pedestrian object recognition, Lane keeping assistance, Collation avoidance, Adaptive headlamps control, Reverse backup sensors, Adaptive cruise control, Active Cruise Control (ACC), Traction control systems, Electronic Stability Control, Automated parking system, Multimedia, Active noise cancelation (ANC), Radio, Radio Data System (RDS), Driver information functions, AM/FM or satellite radio, DC/DVD player, Payment systems, In vehicle Wi-Fi router, Internal lights, Climate control, Chairs adjustment, Electric windows, Mirror adjustment, Central locking, Battery management, Charging management, Vehicle-grid system ACC, Remote control keys, Theft deterrent systems, Immobilizer system, other security systems, Digital cameras, night vision, Lasers, Radar, RF Sensors, and robotic gear-shaft.

The ECU, as mentioned, above can be selected from: electronic/engine control module (ECM), powertrain control module (PCM), transmission control module (TCM), brake control module (BCM or EBCM), central control module (CCM), central timing module (CTM), general electronic module (GEM), body control module (BCM), suspension control module (SCM), airbag control unit (ACU), body control module (BCU), controls door locks, electric windows, and courtesy lights, convenience control unit (CCU), door control unit (DCU), engine control unit, Electric Power Steering Control Unit (PSCU), integrated into the electric power steering (EPS) power-pack, human-machine interface (HMI), Powertrain control module (PCM), seat control unit, speed control unit (SCU), telephone control unit (TCU), telematic control unit (TCU), transmission control unit (TCU), Brake Control Module (BCM), and any combination thereof.

The network based services, as mentioned above, may be selected from a group consisting of: web, physical cable, Wi-Fi, cellular, blue tooth, RF, GPS, vehicle to vehicle communication, vehicle to passenger infrastructure, environment (traffic) to vehicle infrastructure.

The navigation applications or devices as mentioned above may be selected from a group consisting of: satellite navigator, cellular navigator and inertial (gyro) dedicated navigator, north finding system (NFS), relational location system based on RF communication with other vehicles, land signs and beacon. The navigation applications or devices may also be the vehicle's own subsystem navigator.

Reference is now made to FIG. 1 disclosing a schematic diagram of the device [100] and its basic components and including:

a. the input-unit [110] configured to collect real-time and/or offline data from at least one source selected from a group consisting of:
   one or more sensors [111],
   one or more network based services [112],
   one or more navigation applications or navigation devices [113],
   one or more electronic control units (ECU) [114] of the vehicle,
   one or more bus-networks [115] of the vehicle,
   one or more subsystems [116] of the vehicle, and
   one or more On Board Diagnostics (OBD) [117];
b. a database [120], configured to store the data;
c. a detection-unit [130] in communication with the input-unit;
d. an action-unit [140], in communication with the detection unit, configured to send an alert via the communication channels and/or prevent the attack, by breaking or changing the attacked the one or more communication channels.

FIG. 1 further discloses the identification-unit [150], configured for identifying the above mentioned known parameters of a known-attack and update the action-unit [140]; the remote-server [160], configured for communicating with the database [120] for delivering and/or receiving additional parameters of known-attacks detected by other similar devices [100]; and the display-unit [170], configured for notifying and alerting a user of an attack.

Figure 2:
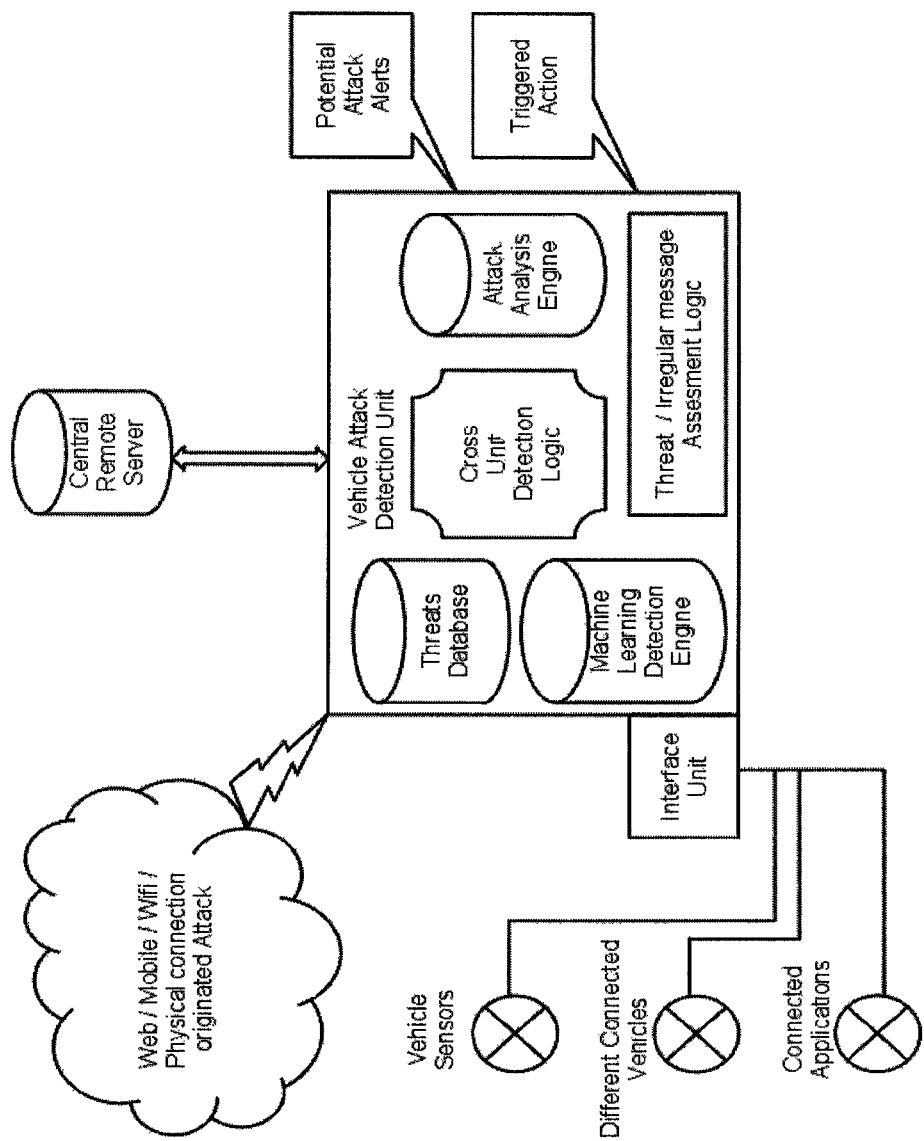
FIG. 2 is a schematic diagram showing an example of implementation to the vehicle's attack detection device.

Reference is now made to FIG. 2 disclosing an example of implementation to the vehicle's cyber attack detection device. In this implementation the detection unit includes: the database, the assessment engine (analysis engine), the machine-learning engine, and where the irrational or irregular message is analyzed separately from the cross detection unit. This example discloses communication between the detection unit and the remote-server, the input-unit (interface unit), the network based services; and where the detection unit further outputs potential attack alerts and triggers the action unit.

FIGS. 1 and 2 further disclose the optional attack vectors including in-vehicle sources, such as but not limited to the vehicle's sensors, electronic control units, bus-network, subsystem, on-board diagnostics and navigation device; and out-vehicle sources, such as but not limited to web, mobile, Wi-Fi, network services, connected applications and other vehicles.

Examples for functioning logic and potential attack vectors which are the characteristics detected by the detection unit:

a. Examples for irregular data's content include but not limited to: unusual readings of the wheels' air pressure; control commands which are longer than usual; discontinuous round per minute (RPM) readings; a STOP command incoming before a SLOW command b. Examples for irregular source of data include but not limited to another vehicle passing by and sending activating messages such as "open windows"; cellular phone that transmit via Bluetooth; cellular spoofed navigation instruction; internal temperature indication; and a STOP command coming outside of the vehicle.

c. Examples for irregular destination for data include but not limited to a network communication which activates the mirrors adjustment.

d. Examples for irrational data's content, when compared with data received by at least one other source include but not limited to: a network system which report of cold climate where the cars temperature sensors sense warm climate; a physical control connection while blocking cellular transmission; a flat tire/s message (low pressure signal) received with an irregularly strong signal; loading of a MP3 file followed by unusual commands to the engine systems such as acceleration; a suspicious metadata for a remote control command followed by sudden press on the gas pedal (which is different than the last 5 minutes average); a cellular device virus detection (by a third party) followed by sequence of irrational commands to the vehicle's sub-systems; and identification of irrational communication characteristics followed by a sharp turn of the stirring wheel while navigation system recognizes an untracked, a dangerous path or even collision.

e. Examples for irrational action of at least one of the vehicle's subsystems, when compared with data received by at least one other subsystem include but not limited to an instruction to unlock and/or open of the vehicles doors while the vehicle is accelerating.

f. Examples for irrational action between at least two of the subsystems include but not limited to an action to accelerate (pushing the gas pedal) and stop (pushing the brake pedal) simultaneously.

g. Examples for an irrational action of at least one of the vehicle's subsystems, when compared with the data received by at least one of the sensors include but not limited to an instruction to activate the air-bags, when the sensors do not sense any collusion situation.

h. Examples for irrational meta-data and meta-content include but not limited to an incoming cellular call for the vehicle's remote control, where the calling number is approved and the command content seems normal, but the cellular provider is unusual or the signal is with unexpected strength; identification of irrational communication characteristics within the vehicle's internal systems (canbus) identified as irregular by the learning machine.

i. Examples for jam or blockage of the communication channels and/or the network-based services include but not limited to a distortion of cellular or GPS communication identified by their signal's strength, transmission method, frequency band, functioning of the other frequencies.

j. Examples for sudden change in the signal features of the network-based services and/or the sensors may include but not limited to weakened or strengthened signal from the vehicles sensors, satellite based communication and cellular communication, while web network has a sudden increased signal.

The invention claimed is:

1. A device executing instructions for detection and prevention of at least one attack on a vehicle via its one or more communication channels, said device comprising:

a database storing real-time and/or offline data; and at least one hardware processor coupled to the database for executing the following:

instructions to collect said real-time and/or offline data from one or more sources selected from a group consisting of:

one or more sensors, one or more network based services, one or more navigation applications or navigation devices, one or more electronic control units (ECU) of said vehicle, one or more bus-networks of said vehicle, one or more subsystems of said vehicle, and one or more on board diagnostics (OBD);

instructions to send an alert via said one or more communication channels and/or prevent said attack, by breaking or changing the attacked said one or more communication channels;

instructions to monitor simultaneously content, meta-data and physical-data of said real-time and/or offline data collected from said one or more sources;

instructions to detect said attack based on irregularities of—or irrational-relation between— said content and said meta-data, said content and said physical-data, said meta-data and said physical-data, at least two said meta-data, or at least two said physical-data.

2. The device according to claim 1, wherein characteristics for said irregularities or said irrational-relation are selected from a group consisting of:

a. irregular said source of said real-time and/or offline data;

b. irregular destination for said real-time and/or offline data;

c. irrational action of at least one of said subsystems, when compared with said real-time and/or offline data received by at least one other of said subsystem;

d. irrational action between at least two of said subsystems;

e. irrational action of at least one of said subsystems, when compared with said content received by at least one of said sensors;

f. irrational said meta-data;
g. irrational meta-content;
h. jam or blockage of said communication channels and/or said network-based services; and
i. sudden change in signal features of said network-based services or said sensors.

3. The device according to claim 1, wherein said database further comprises parameters of at least one known-attack, previously detected as said attack.

4. The device according to claim 3, wherein at least one of the following is held true:
 a. wherein said at least one hardware processor is further configured to extract said parameters of said attack and update said database;
 b. wherein said at least one hardware processor is configured to identify said parameters of said known-attack;
 c. said parameters are selected from a group consisting of:
   i. irregular said real-time and/or offline data's content;
   ii. irregular source of said real-time and/or offline data;
   iii. irregular destination for said real-time and/or offline data;
   iv. irrational said real-time and/or offline data's content, when compared with data received by at least one other said source;
   v. irrational action of at least one of said subsystems, when compared with data received by at least one other subsystem;
   vi. irrational action between at least two of said subsystems;
   vii. irrational action of at least one of said subsystems, when compared with said real-time and/or offline data received by at least one of said sensors;
   viii. irrational meta-data;
   ix. irrational meta-content;
   x. jam or blockage of said communication channels and/or said network-based services;
   xi. sudden change in the signal features of said network-based services and/or said sensors;
   xii. said vehicle location;
   xiii. a brand of vehicle;
   xiv. said sensors;
   xv. said communication channels;
   xvi. said navigation application
   xvii. said navigation device; and
   xviii. communication interfaces; and,
 d. any combination thereof.

5. The device according to claim 3, wherein said device further comprising a remote-server configured to communicate with said database for delivering and/or receiving at least one additional said parameters of said known-attack.

6. The device according to claim 5, wherein at least one of the following is held true:
 a. said remote-server configured to collect said real-time and/or offline data from at least one additional vehicle, monitor the content, the meta-data and the physical-data of said real-time and/or offline data, detect said attack and update said attack to database;
 b. said device is at least partially embedded within one of said vehicle's hardware-cards, software-units and/or within said remote-server; and,
 c. any combination thereof.

7. The device according to claim 1, wherein at least one of the following is held true:
 a. wherein said at least one hardware processor execute a machine-learning engine configured to learn the features and behaviour of said real-time and/or of line data's content, meta-data and physical-data and recognize any unfamiliar behavior;
 b. wherein said at least one hardware processor is configured to instruct a display to notify and alert a user of said attack;
 c. said device is in communication with a remote display configured to notify and alert a user of said attack;
 d. said one or more said subsystems are selected from a group consisting of:
   i. tire pressure monitoring,
   ii. stability control,
   iii. cruise control,
   iv. airbag control,
   v. powertrain control module (PCM),
   vi. transmission control module (TCM),
   vii. brake control module (BCM),
   viii. central control module (CCM),
   ix. central timing module (CTM),
   x. general electronic module (GEM),
   xi. body control module (BCM),
   xii. suspension control module (SCM),
   xiii. convenience control unit (CCU),
   xiv. engine control unit (ECU),
   xv. electric power steering control unit (PSCU),
   xvi. human machine interface (HMI),
   xvii. seat control unit,
   xviii. speed control unit,
   xix. telephone control unit (TCU),
   xx. transmission control unit (TCU),
   xxi. brake control module (ABS or ESC),
   xxii. crash sensors,
   xxiii. airbags,
   xxiv. seatbelts,
   xxv. tire pressure monitoring system (TPMS),
   xxvi. electronic stability control system (ESC),
   xxvii. traction control system (TCS),
   xxviii. anti lock braking system (ABS),
   xxix. electronic brake assistance system (EBA),
   xxx. electronic brake force distribution,
   xxxi. electronic brake-force distribution (EBD) system,
   xxxii. emergency shutdown,
   xxxiii. driven notifications and alerts,
   xxxiv. pedestrian object recognition,
   xxxv. lane keeping assistance,
   xxxvi. collation avoidance,
   xxxvii. adaptive headlamps control,
   xxxviii. reverse backup sensors,
   xxxix. adaptive cruise control,
   xl. active cruise control (ACC),
   xli. traction control systems,
   xlii. electronic stability control,
   xliii. automated parking system,
   xliv. multimedia,
   xlv. active noise cancelation (ANC),
   xlvi. radio,
   xlvii. radio data system (RDS),
   xlviii. driver information functions,
   xlix. AM/FM or satellite radio,
   l. DC/DVD player,
   li. payment systems,
   lii. in vehicle Wi-Fi router,
   liii. internal lights,
   liv. climate control,
   lv. chairs adjustment,
   lvi. electric windows,
   lvii. mirror adjustment,
   lviii. central locking, lix. battery management,
lx. charging management,
lxi. vehicle-grid system,
lxii. active cruise control (ACC),
lxiii. remote control keys,
lxiv. theft deterrent systems,
lxv. immobilizer system,
lxvi. security systems,
lxvii. digital cameras,
lxviii. night vision,
lxix. lasers,
lxx. radar,
lxxi. RF sensors,
lxxii. infotainment system and
lxxiii. robotic gear-shaft; and,
e. any combination thereof.

8. The device according to claim 1, wherein said one or more said sensors are selected from a group consisting of:
a. distance sensor,
b. velocity sensor,
c. temperature sensor,
d. satellite transmission sensor,
e. cellular transmission sensors,
f. video image,
g. air-fuel ratio meter,
h. blind spot monitor,
i. crankshaft position sensor,
j. curb feeler, used to warn driver of curbs,
k. defect detector, used on railroads to detect axle and signal problems in passing trains
l. engine coolant temperature (ECT) sensor, used to measure the engine temperature,
m. hall effect sensor, used to time the speed of wheels and shafts,
n. manifold absolute pressure (MAP) sensor, used in regulating fuel metering,
o. mass flow sensor, or mass airflow (MAF) sensor, used to tell the mass of air entering the engine,
p. oxygen sensor, used to monitor the amount of oxygen in an exhaust of said vehicle,
q. parking sensors, used to alert the driver of unseen obstacles during parking maneuvers,
r. radar gun, used to detect the speed of other objects,
s. speedometer, used measure the instantaneous speed of a land vehicle,
t. speed sensor, used to detect the speed of an object,
u. throttle position sensor, used to monitor the position of the throttle in an internal combustion engine,
v. tire-pressure monitoring sensor, used to monitor the air pressure inside the tires,
w. torque sensor, or torque transducer or torque-meter measures torque (twisting force) on a rotating system,
x. transmission fluid temperature sensor, used to measure the temperature of the transmission fluid,
y. turbine speed sensor (TSS), or input speed sensor (ISS), used to measure the rotational speed of the input shaft or torque converter,
z. variable reluctance sensor, used to measure position and speed of moving metal components,
aa. vehicle speed sensor (VSS), used to measure the speed of the vehicle,
bb. water sensor or water-in-fuel sensor, used to indicate the presence of water in fuel,
cc. wheel speed sensor, used for reading the speed of a vehicle's wheel rotation,
dd. comfort sensors including: seats position, seat heat, air condition and passengers location, and
ee. any combination thereof.

9. The device according to claim 1, wherein said ECU is selected from a group consisting of:
a. electronic/engine control module (ECM),
b. powertrain control module (PCM),
c. transmission control module (TCM),
d. brake control module (BCM),
e. central control module (CCM),
f. central timing module (CTM),
g. general electronic module (GEM),
h. body control module (BCM),
i. suspension control module (SCM),
j. airbag control unit (ACU),
k. body control module (BCU), controls door locks, electric windows, and courtesy lights,
l. convenience control unit (CCU),
m. door control unit (DCU),
n. engine control unit,
o. electric power steering control unit (PSCU), integrated into the electric power steering (EPS) power-pack,
p. human-machine interface (HMI),
q. powertrain control module (PCM),
r. seat control unit,
s. speed control unit (SCU),
t. telephone control unit (TCU),
u. telematic control unit (TCU),
v. transmission control unit (TCU),
w. brake control module (BCM),
x. on board or integrated ECU processing remote services, and
y. any combination thereof.

10. The device according to claim 1, wherein at least one of the following is held true:
a. wherein said at least one hardware processor is configured to initiate further collection of said data from said at least one source;
b. said device further comprises a commercialized anti-virus, malware-application, firewall or other malicious code database, Which can be provided by a third party;
c. said vehicle is driven by a human, by an at least partially autonomous driving system, or by a remote control system or by full autonomous driving system;
d. said vehicle is a robotic platform;
e. said vehicle travels via land, water or air; and,
f. any combination thereof.

11. The device according to claim 1, wherein at least one of the following is held true:
g. said device further comprises an assessment engine configured to evaluate risk-level of said attack to said vehicle and its passengers and prioritize said attack;
h. said one or more network based services are selected from a group consisting of: web, physical cable, Wi-Fi, cellular, blue tooth, RF, GPS, vehicle to vehicle communication, vehicle to passenger infrastructure, environment to vehicle infrastructure;
i. said one or more navigation applications or devices are selected from a group consisting of: satellite navigator, cellular navigator and inertial dedicated navigator;
j. said one or more navigation applications or devices are said vehicle's own subsystem navigator; and,
k. any combination thereof.

12. A method for detecting and preventing at least one attack on a vehicle via its one or more communication channels, said method comprising:

using at least one hardware processor coupled to a database storing real-time and/or offline data for:
  collecting real-time and/or offline data from one or more sources selected from a group consisting of:
    one or more sensors,
    one or more network based services,
    one or more navigation applications or navigation devices,
    one or more electronic control units (ECU) of said vehicle,
    one or more bus-networks of said vehicle,
    one or more subsystems of said vehicle, and
    one or more on board diagnostics (OBD);
  storing said real-time and/or offline data in said database;
  monitoring said real-time and/or offline data for an attack; and if detecting said attack,
  instructing sending an alert and/or preventing said attack by breaking or changing said one or more communication channels;
  wherein said monitoring includes simultaneous examination of content, meta-data and physical-data of said real-time and/or offline data collected from same or different said sources for said detecting of said attack, based on irregularities of—or irrational-relation between—
    said content and said meta-data,
    said content and said physical-data,
    said meta-data and said physical-data,
    at least two said meta-data, or
    at least two said physical-data.

13. The method according to claim 12, wherein characteristics for said irregularities or said irrational-relation are selected from a group consisting of:
  a. irregular said source of said real-time and/or offline data;
  b. irregular destination for said real-time and/or offline data;
  c. irrational action of at least one of said subsystems, when compared with data received by at least one other of said subsystem;
  d. irrational action between at least two of said subsystems;
  e. irrational action of at least one of said subsystems, when compared with said real-time and/or offline data received by at least one of said sensors;
  f. irrational said meta-data;
  g. irrational meta-content;
  h. jam or blockage of said communication channels and/or said network-based services; and
  i. sudden change in signal features of said network-based services or said sensors.

14. The method according to claim 12, wherein said step of storing further comprises storing of parameters of at least one known-attack, previously detected as said attack.

15. The method according to claim 14, further comprising at least one of the following steps:
  a. extracting said parameters;
  b. identifying said parameters of said known-attack and updating for said step of alerting;
  c. said parameters are selected from a group consisting of:
    i. irregular said real-time and/or offline data's content;
    ii. irregular source of said real-time and/or offline data;
    iii. irregular destination for said real-time and/or offline data;
    iv. irrational said real-time and/or offline data's content, when compared with data received by at least one other said source;
    v. irrational action of at least one of said subsystems, when compared with data received by at least one other subsystem;
    vi. irrational action between at least two of said subsystems;
    vii. irrational action of at least one of said subsystems, when compared with said real-time and/or offline data received by at least one of said sensors;
    viii. irrational meta-data;
    ix. irrational meta-content;
    x. jam or blockage of said communication channels and/or said network-based services;
    xi. sudden change in the signal features of said network-based services and/or said sensors;
    xii. said vehicle location;
    xiii. a brand of said vehicle;
    xiv. said sensors;
    xv. said communication channels;
    xvi. said navigation application
    xvii. said navigation device; and,
    xviii. communication interfaces; and,
  d. any combination thereof.

16. The method according to claim 14, further comprising step of communicating said database with a remote-server delivering and/or receiving at least one additional said parameters of said known-attack.

17. The method according to claim 16, wherein said remote-server configured for collecting said real-time and/or offline data from at least one additional vehicle, monitoring the content, the meta-data and the physical-data of said real-time and/or offline data, detecting said attack and updating said attack to database.

18. The method according to claim 12, additionally comprising at least one of the following steps:
  e. said step of detecting further includes learning the features and behaviour of said real-time and/or offline data's content, meta-data and physical-data and recognizing any unfamiliar behavior;
  f. displaying said alert for notifying and alerting a user of said attack;
  g. said one or more said sensors are selected from a group consisting of:
    i. distance sensor,
    ii. velocity sensor,
    iii. temperature sensor,
    iv. satellite transmission sensor,
    v. cellular transmission sensors,
    vi. video image,
    vii. air-fuel ratio meter,
    viii. blind spot monitor,
    ix. crankshaft position sensor,
    x. curb feeler, used to warn driver of curbs,
    xi. defect detector, used on railroads to detect axle and signal problems in passing trains
    xii. engine coolant temperature sensor (ECT), used to measure the engine temperature,
    xiii. hall effect sensor, used to time the speed of wheels and shafts,
    xiv. manifold absolute pressure (MAP) sensor, used in regulating fuel metering,
    xv. mass flow sensor, or mass airflow (MAF) sensor, used to tell mass of air entering the engine,
    xvi. oxygen sensor, used to monitor the amount of oxygen in an exhaust of said vehicle, xvii. parking sensors, used to alert the driver of unseen obstacles during parking maneuvers,
xviii. radar gun, used to detect the speed of other objects,
xix. speedometer, used measure the instantaneous speed of a land vehicle,
xx. speed sensor, used to detect the speed of an object,
xxi. throttle position sensor, used to monitor the position of the throttle in an internal combustion engine,
xxii. tire-pressure monitoring sensor, used to monitor the air pressure inside the tires,
xxiii. torque sensor, or torque transducer or torque-meter measures torque (twisting force) on a rotating system,
xxiv. transmission fluid temperature sensor, used to measure the temperature of the transmission fluid,
xxv. turbine speed sensor (TSS), or input speed sensor (ISS), used to measure the rotational speed of the input shaft or torque converter,
xxvi. variable reluctance sensor, used to measure position and speed of moving metal components,
xxvii. vehicle speed sensor (VSS), used to measure the speed of the vehicle,
xxviii. water sensor or water-in-fuel sensor, used to indicate the presence of water in fuel
xxix. wheel speed sensor, used for reading the speed of a vehicle's wheel rotation,
xxx. comfort sensors including: seats position, seat heat, air condition and passengers location, and
xxxi. any combination thereof;
h. said one or more said subsystems are selected from a group consisting of:
i. tire pressure monitoring,
ii. stability control,
iii. cruise control,
iv. airbag control,
v. powertrain control module (PCM),
vi. transmission control module (TCM),
vii. brake control module (BCM),
viii. central control module (CCM),
ix. central timing module (CTM),
x. general electronic module (GEM),
xi. body control module (BCM),
xii. suspension control module (SCM),
xiii. convenience control unit (CCU),
xiv. convenience control unit (CCU),
xv. convenience control unit (CCU),
xvi. engine control unit (ECU),
xvii. electric power steering control unit (PSCU),
xviii. human machine interface (HMI),
xix. seat control unit,
xx. speed control unit,
xxi. telephone control unit (TCU),
xxii. transmission control unit (TCU),
xxiii. brake control module (ABS or ESC),
xxiv. crash sensors,
xxv. airbags,
xxvi. seatbelts,
xxvii. tire pressure monitoring system (TPMS),
xxviii. electronic stability control system (ESC),
xxix. traction control system (TCS),
xxx. anti lock braking system (ABS),
xxxi. electronic brake assistance system (EBA),
xxxii. electronic brake force distribution,
xxxiii. electronic brake-force distribution (EBD) system,
xxxiv. emergency shutdown,
xxxv. driven notifications and alerts,
xxxvi. pedestrian object recognition,
xxxvii. lane keeping assistance,
xxxviii. collation avoidance,
xxxix. adaptive headlamps control,
xl. reverse backup sensors,
xli. adaptive cruise control,
xlii. active cruise control (ACC),
xliii. traction control systems,
xliv. electronic stability control,
xlv. automated parking system,
xlvi. multimedia,
xlvii. active noise cancelation (ANC),
xlviii. radio,
xlix. radio data system (RDS),
l. driver information functions,
li. AM/FM or satellite radio,
lii. DC/DVD player,
liii. payment systems,
liv. in vehicle Wi-Fi router,
lv. internal lights,
lvi. climate control,
lvii. chairs adjustment,
lviii. electric windows,
lix. mirror adjustment,
lx. central locking,
lxi. battery management,
lxii. charging management,
lxiii. vehicle-grid system,
lxiv. active cruise control (ACC),
lxv. remote control keys,
lxvi. theft deterrent systems,
lxvii. immobilizer system,
lxviii. security systems,
lxix. digital cameras,
lxx. night vision,
lxxi. lasers,
lxxii. radar,
lxxiii. RF sensors,
lxxiv. infotainment system; and,
lxxv. robotic gear-shaft; and,
i. any combination thereof.

19. The method according to claim 12, wherein said ECU is selected from a group consisting of:
a. electronic engine control module (ECM),
b. powertrain control module (PCM),
c. transmission control module (TCM),
d. brake control module (BCM),
e. central control module (CCM),
f. central timing module (CTM),
g. general electronic module (GEM),
h. body control module (BCM),
i. suspension control module (SCM),
j. airbag control unit (ACU),
k. body control module (BCU), controls door locks, electric windows, and courtesy lights,
l. convenience control unit (CCU),
m. door control unit (DCU),
n. engine control unit,
o. electric power steering control unit (PSCU), integrated into the electric power steering (EPS) power-pack,
p. human-machine interface (HMI),
q. powertrain control module (PCM),
r. seat control unit,
s. speed control unit (SCU),
t. telephone control unit (TCU),
u. telematic control unit (TCU), v. transmission control unit (TCU),
w. brake control module (BCM),
x. on board or integrated ECU processing remote services, and
y. any combination thereof.

20. The method according to claim 12, further comprising at least one of the following steps:
- j. evaluating the risk-level of said attack to said vehicle and its passengers and prioritizing said attack;
- k. selecting said one or more network based from a group consisting of: web, physical cable, Wi-Fi, cellular, blue tooth, RF, GPS, vehicle to vehicle communication, vehicle to passenger infrastructure, environment to vehicle infrastructure;
- l. selecting said one or more navigation applications or devices from a group consisting of: satellite navigator, cellular navigator, north finding systems (NFS), or inter-vehicle orientation system and inertial dedicated navigator; and,
- m. any combination thereof.

* * * * *